United States Patent
Nieto et al.

(10) Patent No.: US 8,391,342 B2
(45) Date of Patent: Mar. 5, 2013

(54) MOBILE WIRELESS COMMUNICATIONS DEVICE FOR MODULATIONS WITH MEMORY

(75) Inventors: John W. Nieto, Rochester, NY (US); James A. Norris, Fairport, NY (US)

(73) Assignee: Harris Corporation, Melbourne, FL (US)

(*) Notice: Subject to any disclaimer, the term of this patent is extended or adjusted under 35 U.S.C. 154(b) by 1016 days.

(21) Appl. No.: 12/246,940

(22) Filed: Oct. 7, 2008

(65) Prior Publication Data

US 2010/0086008 A1 Apr. 8, 2010

(51) Int. Cl.
H04B 1/38 (2006.01)
H04B 1/00 (2006.01)

(52) U.S. Cl. .................... 375/219; 375/130
(58) Field of Classification Search ............. 375/130, 375/219
See application file for complete search history.

(56) References Cited

U.S. PATENT DOCUMENTS

| | | | |
|---|---|---|---|
| 2002/0106989 A1* | 8/2002 | Aizawa et al. | 455/67.1 |
| 2003/0226088 A1* | 12/2003 | Cameron et al. | 714/755 |
| 2004/0078745 A1* | 4/2004 | Kruger et al. | 714/758 |
| 2006/0262832 A1* | 11/2006 | Kaewell, Jr. | 375/141 |
| 2007/0291829 A1* | 12/2007 | Nabetani et al. | 375/219 |
| 2008/0039024 A1 | 2/2008 | Ikeda | 455/73 |
| 2008/0240167 A1* | 10/2008 | Ivonnet et al. | 370/515 |

OTHER PUBLICATIONS

Harris® Assured Communications® "AN/PRC-117G(V)1(C) Type-1 Wideband Multiband Multimission Radio", www.harris.com, Apr. 2008.

* cited by examiner

Primary Examiner — David C. Payne
Assistant Examiner — Brian J Stevens
(74) Attorney, Agent, or Firm — Allen, Dyer, Doppelt, Milbrath & Gilchrist, P.A.

(57) ABSTRACT

A mobile wireless communications device may include an antenna, and a transceiver coupled to the antenna. The transceiver may use a modulation having memory for a message in a frame structure including a data portion and a termination portion based upon the data portion. The termination portion may drive the modulation to a desired known ending state. The modulation may include a spread spectrum modulation or a non-spread modulation.

17 Claims, 2 Drawing Sheets

DATA PORTION
(E.G. 256 DATA SYMBOLS OR 31-CHIP M LENGTH SEQUENCE) — 31

- PAYLOAD DATA IS GENERATED BY TRANSMITTER MOBILE WIRELESS COMMUNICATIONS DEVICE
- INITIAL MODULATION MEMORY STATE IS UNKNOWN TO RECEIVER MOBILE WIRELESS COMMUNICATIONS DEVICE

TERMINATION PORTION
(E.G. 1 DATA SYMBOLS OR 1-CHIP M LENGTH SEQUENCE) — 32

- INSERTED INTO FRAME STRUCTURE BY THE TRANSMITTER MOBILE WIRELESS COMMUNICATIONS DEVICE
- INCLUDES INITIAL MODULATION MEMORY STATE FOR TRANSMITTED MESSAGE AND IS BASED UPON THE DATA PORTION

CHANNEL ESTIMATE PORTION
(E.G. 31 DATA SYMBOLS) — 33

- PROVIDES AN ESTIMATE OF DISTORTION IN THE COMMUNICATION CHANNEL FROM INTERFERENCE AND ENCODING

MOBILE WIRELESS COMMUNICATIONS DEVICE FOR MODULATIONS WITH MEMORY

FIELD OF THE INVENTION

The present invention relates to the field of mobile wireless communications devices, and, more particularly, to mobile wireless communications devices using modulations having memory and related methods.

BACKGROUND OF THE INVENTION

Mobile communications devices have become an integral part of society over the last two decades. Indeed, more than eighty-two percent of Americans own a mobile communications device, for example, a cell phone. The typical mobile communications device includes an antenna, and a transceiver coupled to the antenna. The transceiver and the antenna cooperate to transmit and receive communications signals.

The typical transceiver includes a power amplifier for amplifying low voltage signals for transmission via the antenna. Given that most mobile communications devices operate on limited battery power, energy efficient power amplifiers may be desirable. More specifically and as will be appreciated by those skilled in the art, Class C and E power amplifiers are common in mobile communications devices since they are efficient power amplifiers. These classes of power amplifiers are more efficient than Class A or B amplifiers, for example, but are subject to performance tradeoffs, for example, they may be nonlinear over certain frequencies and may introduce greater amounts of distortion into the amplified signal (if the signal requires a linear amplifier).

An approach to compensating for this tradeoff is to encode transmitted signals with constant envelope (CE) or continuous phase modulation (CPM) waveforms. These modulations provide for lower energy demands on the power amplifier of the transceiver, for example, by reducing the peak-to-average power ratio (PAPR), increasing average transmit power (providing greater transmission range), and increasing amplifier efficiency.

For example, U.S. Patent Application Publication No. 2008/0039024 to Ikeda et al. discloses an amplifying circuit. The amplifying circuit processes an input orthogonal frequency-division multiplexing (OFDM) signal and provides a pair of CE output signals to provide better power efficiency and less distortion.

A potential drawback to these modulations, for example, CPM or Minimum-shift keying (MSK), is the use of the inherent memory of the modulation when demodulating/decoding the waveform in order to obtain good demodulator performance. When the mobile communications device receives a transmitted signal which uses a modulation with memory, the decoder uses not only the current signal portion to demodulate but in addition uses previous signal portions (i.e. memory) to demodulate the current signal. In other words, the phase of the transmitted signal is not independent over successive signaling intervals. Decoding modulations with memory increases the computational and memory demands on the transceiver, i.e. a maximum likelihood sequence estimator is typically used to demodulate modulations with memory, thereby increasing the complexity of the device, which may be undesirable in a limited power compact mobile device.

SUMMARY OF THE INVENTION

In view of the foregoing background, it is therefore an object of the present invention to provide a mobile wireless communications device that demodulates received signals more efficiently.

This and other objects, features, and advantages in accordance with the present invention are provided by a mobile wireless communications device comprising an antenna, and a transceiver coupled to the antenna. The transceiver may use a modulation having memory for a message in a frame structure including a data portion and a termination portion based upon the data portion. The termination portion may drive the modulation to a desired known ending state. Advantageously, the message may be readily demodulated at the receiver since the receiver can exploit the known ending state, thereby reducing the computational load on the mobile wireless communications device and increasing power efficiency.

Additionally, the frame structure may further comprise a channel estimate portion. In other embodiments, the modulation may comprise, for example, a spread spectrum modulation. The modulation may comprise at least one of a continuous phase modulation (CPM), a Gaussian minimum shift keying (GMSK), a differential phase shift keying (DPSK), and a minimum-shift keying (MSK). In other embodiments, the modulation may comprise a non-spread modulation. Additionally, the mobile wireless communications device may further comprise a housing carrying the antenna and the transceiver.

Another aspect is directed to a wireless communication system using a modulation having memory. The wireless communication system may include a transmitter mobile wireless communications device comprising an antenna, and a transmitter coupled to the antenna and transmitting a message in a frame structure including a data portion and a termination portion based upon the data portion. The wireless communication system may also include a receiver mobile wireless communications device comprising an antenna, and a receiver coupled to the antenna for receiving the message. The transmitter may use the termination portion to drive the modulation to a desired known ending state in order to simplify the receive processing at the receiver mobile wireless communications device.

Another aspect is directed to a method for operating a mobile wireless communications device having an antenna, and a transceiver coupled thereto. The method may include using a modulation having memory for a message in a frame structure including a data portion, and inserting a termination portion based upon the data portion into the frame structure. The termination portion may drive the modulation to a desired known ending state.

BRIEF DESCRIPTION OF THE DRAWINGS

FIG. 2 is a schematic diagram of the frame structure used by the wireless communication system of FIG. 1.

DETAILED DESCRIPTION OF THE PREFERRED EMBODIMENTS

Figure 1:
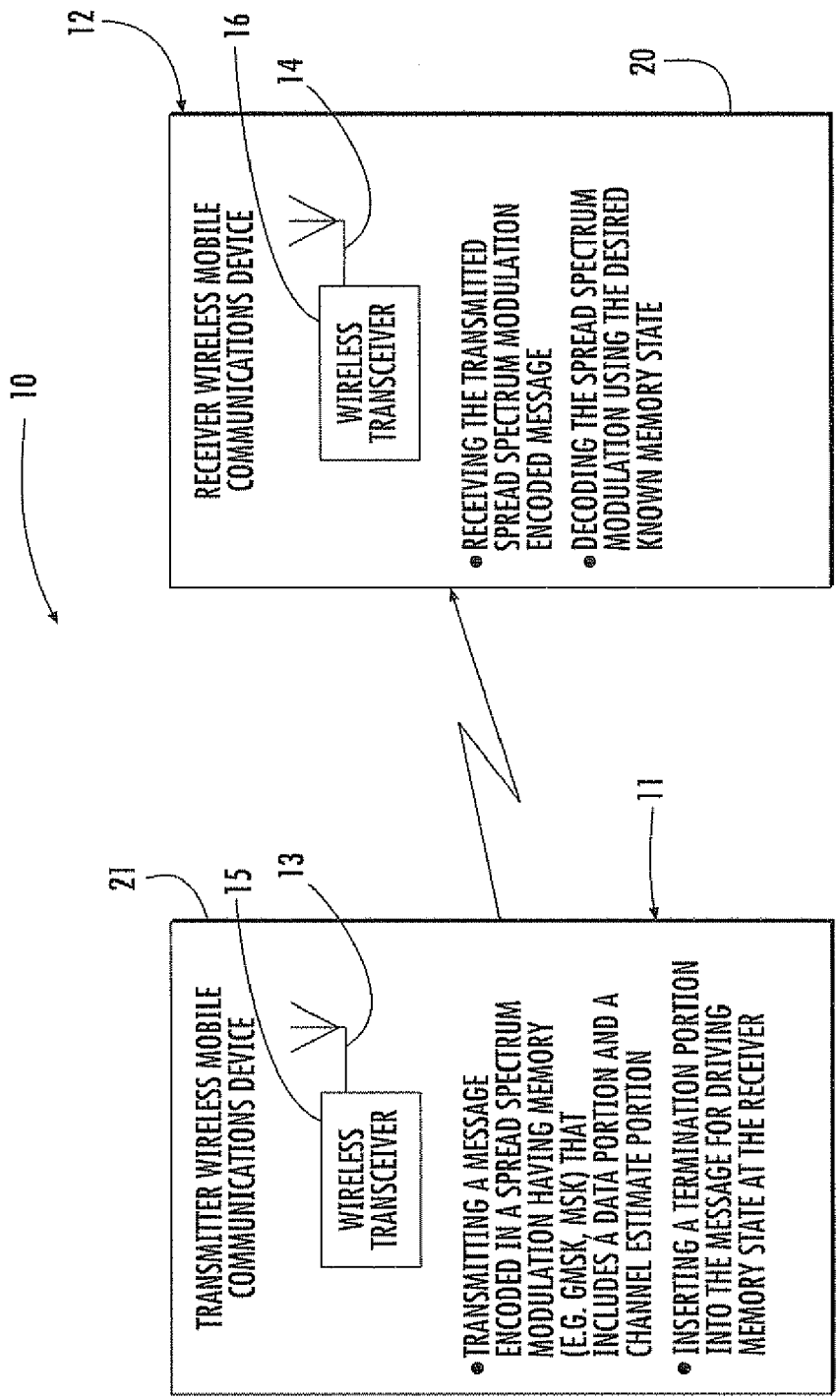
FIG. 1 is a schematic block diagram of the wireless communication system according to the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring initially to FIG. 1, a wireless communication system 10 according to the present invention is now described. As will be appreciated by those skilled in the art, the wireless communication system 10 uses a modulation having memory and corresponding memory states, for example, phase states and previous data states. The modulation's movement between each of these memory states is mapped using a trellis diagram, as will be appreciated by those skilled in the art.

In some embodiments, the modulation may use spread spectrum methods to expand bandwidth. For example, the modulation may include minimum-shift keying (MSK), which includes four memory states 0-3. In MSK, memory state 0 may move to memory state 1 or 3 only; memory state 1 may move to memory state 0 or 2 only; memory state 2 may move to memory state 1 or 3 only; and memory state 3 may move to memory state 0 or 2 only. The modulation may also alternatively comprise at least one of a continuous phase modulation (CPM), a Gaussian minimum shift keying (GMSK), and a differential phase shift keying (DPSK). In other embodiments, the modulation may comprise a non-spread modulation. As will be appreciated by those skilled in the art, the wireless communication system 10 and method described herein may be used with any modulation that has memory.

The wireless communication system 10 illustratively includes a transmitter mobile wireless communications device 11 comprising an antenna 13, and a transmitter, i.e. the illustrated transceiver 15, coupled to the antenna. The wireless communication system 10 also illustratively includes a companion receiver mobile wireless communications device 12 comprising an antenna 14, and a transmitter, i.e. the illustrated transceiver 16, coupled to the antenna. Additionally, the mobile wireless communications devices 11-12 each illustratively include a housing 20-21 carrying the antennas 13-14 and the transceivers 15-16. The mobile wireless communications devices 11-12 may each comprise, for example, Falcon® III AN/PRC-117G(V)1(C) manpack devices, as available from the Harris Corporation of Melbourne, Fla., the assignee of the present application, modified with the system and method described herein.

The mobile wireless communications devices 11-12 communicate with each other within the wireless communication system 10. The transmitter mobile wireless communications device 11 generates data for transmission. The data (message) is modulated with a modulation with memory and then transmitted via the antenna 13 to the receiver mobile wireless communications device 12. As will be appreciated by those skilled in the art, the transmission process may also occur in reverse, i.e. receiver mobile wireless communications device 12 to the transmitter mobile wireless communications device 11.

Referring now additionally to FIG. 2, the transmitted data is arranged into a frame structure 30 comprising a plurality of data symbols. The frame structure 30 illustratively includes a data portion 31 (payload). As will be appreciated by those skilled in the art, the data portion 31 includes data generated by the transmitter mobile wireless communications device 11. The frame structure 30 also illustratively includes a channel estimate portion 33, which may be used to track the over-the-air time-varying multipath channel the transmitted waveform encounters, i.e. distortion and interference. The channel estimate portion 33 may include data symbols known system wide, i.e. known by both the transmitter and receiver mobile wireless communications devices 11-12.

When the receiver mobile wireless communications device 12 receives the data transmission, the device decodes/demodulates the data. As will be appreciated by those skilled in the art, since the modulation has memory, the receiver mobile wireless communications device 12 may use a trellis to process and exploit the memory of the waveform.

Moreover, in prior art devices, such as, a spread spectrum device, the initial memory state at the beginning of each spread bit of the spread spectrum waveform is unknown to the receiver communications device since only the transmitter communications device has this information. Therefore, the prior art receiver communications device performs demodulation tasks for the received encoded data for each possible beginning memory state, for example, in MSK, two states. Keeping with the exemplary MSK modulation, the prior art receiver communications device performs twice the decoding computations than a system that "knows" the starting state (or ending state).

In the wireless communication system 10, the frame structure 30 illustratively includes a termination portion 32 based upon the data portion 31. The termination portion 32 uses a look-up table or another method to drive the modulation to a desired known ending state, i.e. the receiver mobile wireless communications device 12 can exploit the known ending state (or starting state) to reduce computational complexity of demodulation process. In the case of MSK, the computational load is reduced by a factor of two. The lessening of computational load on the receiver mobile wireless communications device 12 reduces the power demands on onboard processors, thereby increasing the power efficiency and extending battery life.

The termination portion 32 has a length based upon a memory length for the modulation. For example, in a CPM equalized waveform using GMSK, the data portion 31 comprises 256 data symbols, the termination portion following data portion (or initialization portion before channel estimate portion) 32 comprises a single time-varying data symbol, and the channel estimate portion 33 comprises 31 data symbols. In CPM spread spectrum communications using MSK, the data portion 31 comprises a 31-chip maximum length sequence, and the termination portion 32 comprises one time-varying chip.

Another aspect is directed to a method for operating a mobile wireless communications device 11-12 having an antenna 13-14, and a transceiver 15-16 coupled thereto. The method may include using a spread spectrum modulation having memory for a message in a frame structure 30 including a data portion 31, and inserting a termination portion 32 based upon the data portion into the frame structure. The termination portion 32 may drive the spread spectrum modulation to a desired known ending state.

As will be appreciated by those skilled in the art, two exemplary implementations for the above described system are described. The first example includes an effective memory length of a spread-spectrum waveform using a maximum length sequence as a spreading sequence, for example, to spread by 31 bits. So after every user data bit is spread by 31 bits, a time-varying termination sequence of 1 bit is added at the modulator to drive the end state (at end of 32 bits) to a known state. Frame length (i.e. spreading length) of the spread-spectrum sequence is thus 32 bits. The second example includes a non-spread waveform with memory including a data portion, for example, 256 symbols, and a channel estimation portion, for example, 31 symbols. To reduce the complexity of channel estimation portion, it is desirable that after the end of the data portion, the modulation be at a known ending state (or known starting state for channel estimation portion). Thus, a time-varying termination sequence is added in the modulator after the data portion of waveform so that a known starting state can be exploited by channel estimation process at the receiver. Frame structure would then become a 256 symbol data portion followed by a time-varying 1 symbol termination sequence portion followed by a 31 symbol channel estimation portion (i.e. total frame size is thus 288 symbols).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile wireless communications device comprising:
an antenna; and
a transceiver coupled to said antenna and configured to use a modulation having memory and corresponding trellis memory states for a message in a frame structure, the frame structure including a data portion and a termination portion, the termination portion being based upon the data portion and a number of trellis memory states, driving the modulation to a desired known ending trellis memory state, and having a length based upon a memory length of the modulation.

2. The mobile wireless communications device according to claim 1 wherein the frame structure further comprises a channel estimate portion.

3. The mobile wireless communications device according to claim 1 wherein the modulation comprises a spread spectrum modulation.

4. The mobile wireless communications device according to claim 1 wherein the modulation comprises a non-spread modulation.

5. The mobile wireless communications device according to claim 1 wherein the modulation comprises at least one of a continuous phase modulation (CPM), a Gaussian minimum shift keying (GMSK), a differential phase shift keying (DPSK), and a minimum-shift keying (MSK).

6. The mobile wireless communications device according to claim 1 further comprising a housing carrying said antenna and said transceiver.

7. A mobile wireless communications device comprising:
an antenna; and
a transceiver coupled to said antenna and configured to use a spread spectrum modulation having memory and corresponding trellis memory states for a message in a frame structure including a data portion, a termination portion based upon the data portion and a number of trellis memory states, and a channel estimate portion;
the termination portion for driving the spread spectrum modulation to a desired known ending trellis memory state and having a length based upon a memory length of the spread spectrum modulation.

8. The mobile wireless communications device according to claim 7 wherein the spread spectrum modulation comprises at least one of a continuous phase modulation (CPM), a Gaussian minimum shift keying (GMSK), a differential phase shift keying (DPSK), and a minimum-shift keying (MSK).

9. A wireless communication system using a modulation having memory and corresponding trellis memory states, the wireless communication system comprising:
a transmitter mobile wireless communications device comprising
an antenna, and
a transmitter coupled to said antenna and configured to transmit a message in a frame structure including a data portion and a termination portion based upon the data portion and a number of trellis memory states, and to use the termination portion for driving the modulation to a desired known ending trellis memory state, the termination portion having a length based upon a memory length of the modulation; and
a receiver mobile wireless communications device comprising
an antenna, and
a receiver coupled to said antenna and configured to receive the message.

10. The wireless communication system according to claim 9 wherein the frame structure further comprises a channel estimate portion.

11. The wireless communication system according to claim 9 wherein the modulation comprises a spread spectrum modulation.

12. The wireless communication system according to claim 9 wherein the modulation comprises a non-spread modulation.

13. A method for operating a mobile wireless communications device having an antenna, and a transceiver coupled thereto, the method comprising:
operating the antenna and the transceiver to use a modulation having memory and corresponding trellis memory states for a message in a frame structure including a data portion, and insert a termination portion based upon the data portion and a number of trellis memory states into the frame structure;
the termination portion driving the modulation to a desired known ending trellis memory state and having a length based upon a memory length of the modulation.

14. The method according to claim 13 wherein the frame structure further comprises a channel estimate portion.

15. The method according to claim 13 wherein the modulation comprises a spread spectrum modulation.

16. The method according to claim 13 wherein the modulation comprises a non-spread modulation.

17. The method according to claim 13 wherein the modulation comprises at least one of a continuous phase modulation (CPM), a Gaussian minimum shift keying (GMSK), a differential phase shift keying (DPSK), and a minimum-shift keying (MSK).

* * * * *